F. H. JONES.
STEERING GEAR.
APPLICATION FILED FEB. 3, 1910.

997,919.

Patented July 11, 1911.

Witnesses
Walter Troemel.
Thomas W. McMeans

Inventor
Frank H. Jones.
By Bradford Hood
Attorneys.

UNITED STATES PATENT OFFICE.

FRANK H. JONES, OF MUNCIE, INDIANA, ASSIGNOR TO WARNER GEAR COMPANY, OF MUNCIE, INDIANA, A CORPORATION OF INDIANA.

STEERING-GEAR.

997,919.

Specification of Letters Patent. Patented July 11, 1911.

Application filed February 3, 1910. Serial No. 541,783.

*To all whom it may concern:*

Be it known that I, FRANK H. JONES, a citizen of the United States, residing at Muncie, in the county of Delaware and State of Indiana, have invented a certain new and useful Steering-Gear, of which the following is a specification.

The object of my invention is to produce a steering gear head for automobiles of such form that the thrust bearings for the worm may be readily adjusted and also of such form that the worm and its bearings may be readily withdrawn for examination without disturbing the adjustment of the bearings so that the parts may be replaced and brought up firmly to position without the necessity of new adjustment.

The accompanying drawings illustrate my invention.

Figure 1:
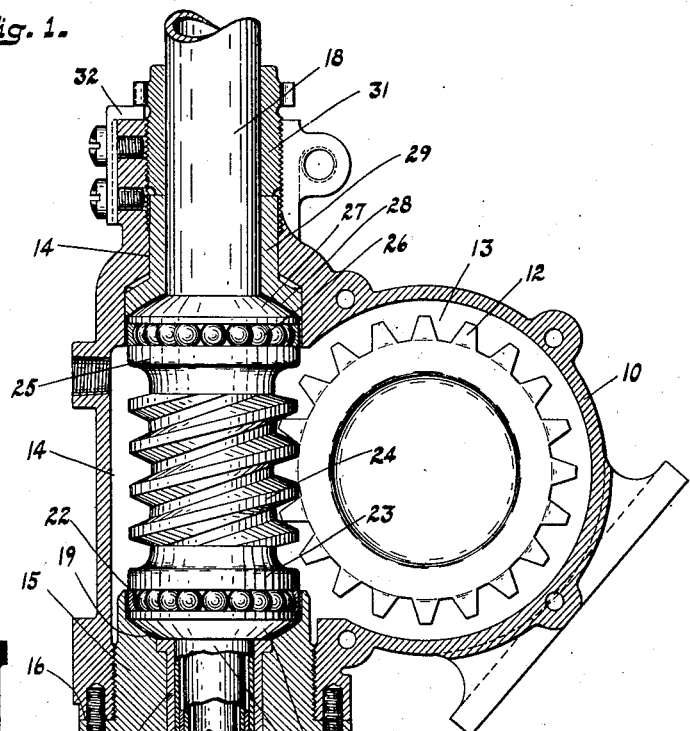
Figure 2:
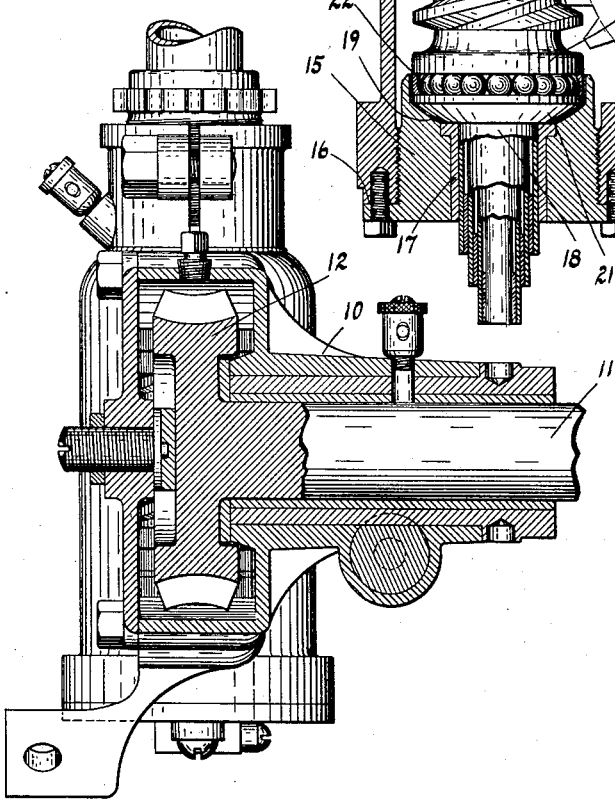

Figure 1 is a section axially of the worm with the worm in full lines, and Fig. 2 a section axially of the worm wheel.

In the drawings, 10 indicates a suitable bracket or inclosing casing within which the parts are journaled and mounted. The shaft 11 (to which the steering wheels are connected in the usual way) is journaled in casing 10 and carries a worm wheel 12 which lies within chamber 13. Extending transversely of chamber 13, and communicating with it at one side, is a chamber 14 in the lower end of which is mounted a nut 15, which is threaded into the lower end of chamber 14 and brought to a definite and positive seat 16 on the lower end of casing 10. Nut 15 is provided with an axial bearing 17 in which is journaled the steering spindle 18, and at its inner end the said nut is provided with a seat 19 adapted to receive the lower cup 21 of a ball bearing 22. The upper cup 23 of bearing 22 lies immediately against the lower end of the worm 24 which is splined upon stem 18 so as to mesh with the worm wheel 12. Resting upon the upper end of worm 24 is the lower cup 25 of an upper ball bearing 26 having an upper cup 27. The cup 27 is received in a seat 28 formed in the lower end of a sleeve 29 mounted in the upper reduced end of chamber 14, the spindle 18 being journaled therein. The upper end of sleeve 29 is engaged by the inner end of a nut 31 which is threaded into the upper end of chamber 14. Nut 31 is held in any position of adjustment by means of the holding clip 32.

In operation the nut 15 is brought up to the positive seat 16 and the two ball bearings are properly adjusted relative to the worm 24 by the nut 31. Whenever it is desired to withdraw the worm for inspection or replacement it is merely necessary to withdraw nut 15, whereupon the various parts can be slipped off of stem 18 and the parts can be returned and nut 15 brought positively to its seat without the necessity of readjustment of the parts. These parts, however, may be readily readjusted if necessary by turning nut 31, which is readily accessible.

I claim as my invention:

1. A steering gear comprising a main containing casing, a worm wheel journaled therein, a nut threaded into the lower end of the casing and brought to a permanent seat in its inward movement, a thrust bearing supported by the inner end of said nut and withdrawable in the same direction as the nut, a steering stem journaled in said nut, a worm carried by said steering stem above the thrust bearing and meshing with the worm wheel, a second thrust bearing carried on the steering stem above the worm, a seat for the upper member of said second thrust bearing mounted in the casing, and an adjustable nut threaded into the upper end of the casing and engaging said last mentioned seat member, the first mentioned nut having a diameter exceeding that of the bearings and the worm supported thereby for the purpose set forth.

2. A steering gear comprising a main containing casing, a worm wheel journaled therein, a nut threaded into the lower end of the casing and brought to a permanent seat in its inward movement, a thrust bearing supported by the inner end of said nut and withdrawable in the same direction as the nut, a steering stem journaled in said nut, a worm carried by said steering stem above the thrust bearing and meshing with the worm wheel, a second thrust bearing carried on the steering stem above the worm, a seat for the upper member of said second thrust bearing mounted loosely in the casing, and an adjustable nut threaded into the upper end of the casing and engaging said last mentioned seat member, the first mentioned nut having a diameter exceeding that of the bearings and the worm supported thereby for the purpose set forth.

In witness whereof, I have hereunto set my hand and seal at Muncie, Indiana, this twenty first day of January, A. D. one thousand nine hundred and ten.

FRANK H. JONES. [L. S.]

Witnesses:
C. E. DAVIS,
W. H. CHURCH.

---

Copies of this patent may be obtained for five cents each, by addressing the "Commissioner of Patents, Washington, D. C."